United States Patent [19]
Griffiths

[11] Patent Number: 5,357,738
[45] Date of Patent: Oct. 25, 1994

[54] APPARATUS FOR THE TREATMENT OF LAWNS

[75] Inventor: Bruce Griffiths, Bloemfontein, South Africa

[73] Assignee: Southern Cross Industries (Proprietary) Limited, Bloemfontein, South Africa

[21] Appl. No.: 83,365

[22] Filed: Jun. 28, 1993

[30] Foreign Application Priority Data

Mar. 25, 1993 [ZA] South Africa .................. 93/2118

[51] Int. Cl.$^5$ ............................................. A01D 34/64
[52] U.S. Cl. ...................................... 56/17.5; 56/255; 56/295
[58] Field of Search .................. 56/12.8, 13.4, 16.9, 56/17.4, 17.5, 255, 295

[56] References Cited

U.S. PATENT DOCUMENTS

| | | | |
|---|---|---|---|
| 3,757,503 | 9/1973 | Soldavini | 56/202 |
| 4,932,194 | 6/1990 | Allen | 56/320.2 |
| 4,951,449 | 8/1990 | Thorud | 56/2 |
| 5,090,183 | 2/1992 | Thorud et al. | 56/2 |
| 5,142,851 | 9/1992 | Lydy et al. | 56/13.4 |

*Primary Examiner*—Ramon S. Britts
*Assistant Examiner*—Pamela A. O'Connor
*Attorney, Agent, or Firm*—Marshall, O'Toole, Gerstein, Murray & Borun

[57] ABSTRACT

Apparatus for cutting and mulching lawns includes a shallow substantially cylindrical housing having an open bottom and adapted, in use, to have its axis perpendicular to a lawn to be cut; a blade, mounted within the housing to rotate about an axis co-axial with that of the housing, the blade extending radially from the axis and rotating in a plane near the bottom of the housing; a grass exit chute communicating with the inside of the housing; a source of rotational power in the form of an electric motor for rotating the blade; means for changing the direction of rotation of the blade; and means for allowing cut grass within the housing to pass out of the housing into the chute when the blade is rotating in a first direction and to prevent cut grass in the housing from entering the chute when the blade is rotating in a second direction.

8 Claims, 2 Drawing Sheets

APPARATUS FOR THE TREATMENT OF LAWNS

INTRODUCTION TO THE INVENTION

This invention relates to apparatus for the treatment of lawns and, more specifically, for the mowing and mulching of lawns.

BACKGROUND TO THE INVENTION

When lawns are mown it is generally advisable to collect the grass cuttings which would otherwise collect on the surface of the lawn and apart from damaging the lawn, would look unsightly. The cuttings are often collected by way of a suitable grass box or collector attached to the mower which is used.

Lawnmowing is a time consuming and arduous task. An improvement to lawnmowing design would be a device which saves labour and time. An easy mechanism which would save the user from having to regularly detach the grassbox and carry this to a dumping site would save much time while still giving the user the opportunity of operating the lawnmower so that it collected all grass cuttings. Presently designs are such when lawnmowers are operated without grass catchers fitted in an effort to reduce the time taken to cut a lawn the grass entering the grass exit chute is compacted against the safety plate which closes this chute when no catcher is fitted. This forms large agglomerates of grass which are not evenly distributed over the lawn and need physical removal after mowing resulting in no labour saving at all.

It has been recognised that it could be beneficial to lawns if at least a portion of the cuttings could be distributed over the lawn provided that these mowings were somewhat finer than is usually the case and that they were relatively evenly distributed.

To do this the so called rotary type of lawnmower (i.e. with a blade having a substantially vertical axis of rotation) has been provided with a removable or adjustable baffle at the exit chute thereof. This baffle blocks or partially blocks the exit chute so that grass mowings under the lawnmower float in an air pocket above the blades before falling again into the blades and being chopped into small pieces. This process may be repeated before the grass falls onto the lawn in the form of mulch, the mowings being of a size small enough to find their way into the lawn and not simply lie on the top thereof.

Failure to provide such a baffle plate when mowing without the grass catcher fitted results in the grass entering the exit chute compacting and forming grass agglomerates. These are unsightly as they eventually exit the mower housing and as they are typically in lump form which require physical removal after mowing is complete, they can in no way contribute to fertilisation of the lawn by means of organic decay or composting.

It will readily be appreciated that the advantages of a mower of the above type include the fact that the mower may be used for mulching at one time and to clean up new cuttings and excess mulched grass at another. A disadvantage is however that the installation, removal or adjustment of the baffle is tedious.

One object of this inventions to provide an apparatus for the treatment of lawns which can readily be changed from a mowing to a mulching configuration.

SUMMARY OF THE INVENTION

According to the invention, an apparatus suitable for treating lawns comprises:

a shallow generally cylindrical housing having an open bottom and adapted, in use, to have its axis perpendicular to a lawn to be cut;

a blade, mounted within the housing to rotate about an axis co-axial with that of the housing, the blade extending radially from the axis and rotating in a plane near the bottom of the housing; a grass exit chute communicating with the inside of the housing;

a source of rotational power for rotating the blade;

means for changing the direction of rotation of the blade; and means for allowing cut grass within the housing to pass out of the housing into the chute when the blade is rotating in a first direction and to prevent cut grass in the housing from entering the chute when the blade is rotating in a second direction.

Further, according to the invention, the housing is mounted on wheels for supporting it on a grass surface to be cut.

Still further, according to the invention, the apparatus includes a handle for use in pushing the apparatus on a grass surface.

Still further, according to the invention, the blade extends on both sides of its rotational axis and has cutting edges on opposing edges.

Still further, according to the invention, the grass exit chute is located substantially tangentially to the housing and intercepting the path of grass cuttings in the housing when the blade is rotating in a first direction.

Still further, according to the invention, the grass exit chute is at least partially located above the level of the blade.

Still further, according to the invention, the source of rotational power is an electric motor.

Still further, according to the invention the means for changing the direction of rotation of the blade is a reversible electric motor and a suitable switching mechanism.

Still further, according to the invention, there is a deflector plate within the housing adjacent the chute, the deflector plate being positioned to deflect grass cuttings cut by the blade moving in the second direction from entering the chute.

BRIEF DESCRIPTION OF THE DRAWINGS

An embodiment of the invention, described by way of example only, follows with reference to the accompanying drawings in which.

DETAILED DESCRIPTION OF THE DRAWINGS

Figure 1:
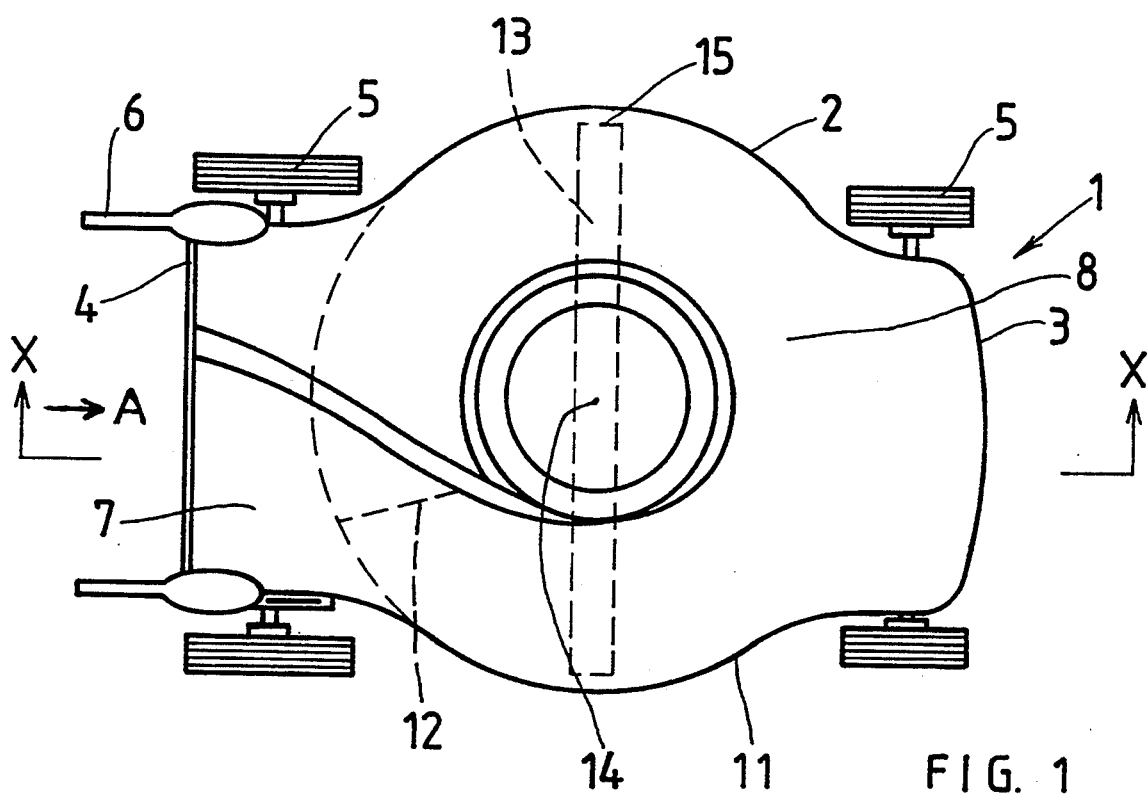
FIG. 1 is a partial plan view of a lawnmower according to the invention.

In this embodiment of the invention, a mower (1) for use in mowing the grass of lawns on the one hand and for mulching the lawns on the other, is provided.

The mower (1) has a configuration which is substantially the same as many standard mowers having a horizontal blade which rotates about a vertical axis and comprises a shallow circular housing (2) of cylindrical shape which is extended at its forward and rear ends (3) and (4) to provide positions for the mounting of four wheels (5) for supporting the mower (1) on a grass surface.

Adjacent the wheels (5) at the rear end (4) of the mower is positioned a suitable handle (6).

The housing (2) has an exit chute (7) through which grass cuttings may pass, preferably into a suitable container (not shown) adapted to be located at the rear end (4) of the housing. The chute (7) is offset from the axis of the housing and is generally tangential thereto such that it effectively forms an extension to the path of grass cuttings and the like within the housing when they are moving in a clockwise direction when viewed from the top.

Figure 2:
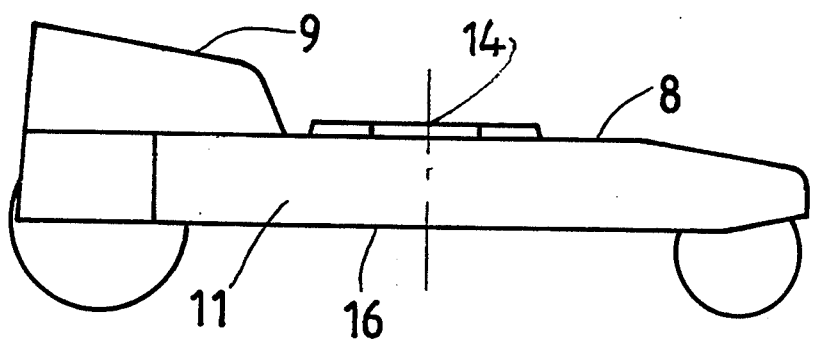
FIG. 2 is a section through part of the housing of the lawnmower along x—x of FIG. 1.
Figure 3:
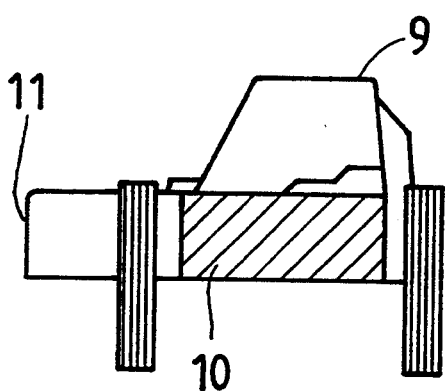
FIG. 3 is an end elevation of the lawnmower housing on A of FIG. 1 with the housing being partly compressed.
Figure 4:
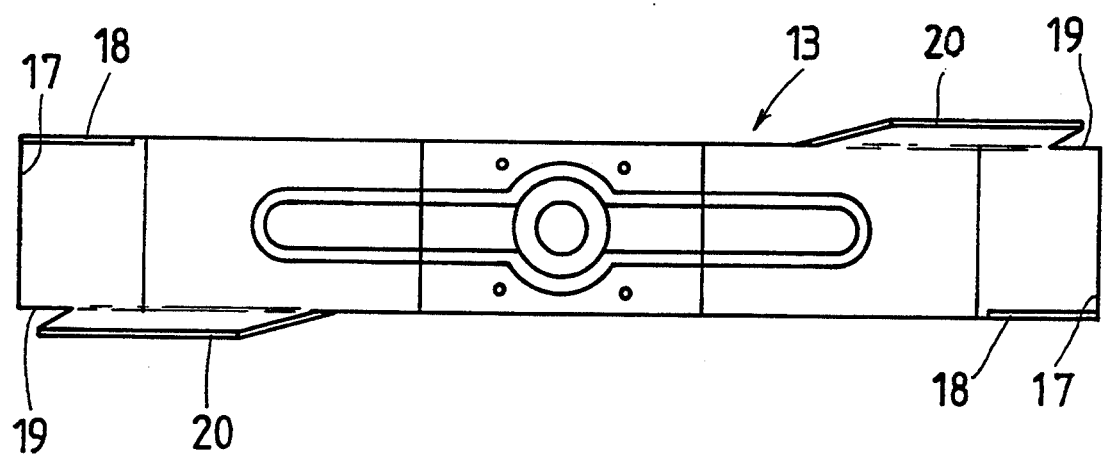
FIG. 4 is a plan view of a blade for the mower.

As can be seen from FIGS. 2 and 3 of the drawings the exit chute extends above the top (8) of the housing and is formed by a suitable cowl (9). The bottom part of the exit chute corresponding to the depth of the housing is closed off by a member (10) which effectively forms a continuation of the cylindrical wall (11) of the housing. Furthermore, adjacent the chute (7) and within the housing is a deflector plate (12) which is substantially perpendicular to the plane of rotation of the blade and which is positioned in the path of grass cuttings moving in an anticlockwise direction within the housing and serves to deflect these cuttings away from the exit chute (7).

Located within the housing is an elongated cutting blade (13) which is mounted about a central substantially vertical axis (14) so as to be able to rotate coaxially within the housing. The length of the blade is such that its ends (15) fall just short of the interior of the housing and its position is such that it is located near the bottom (16) of the housing which is open.

The blade is made from pressed metal and has a central mounting section terminating in two cuttings sections (17), one at each end. The cutting sections (17) have a normal cutting edge (18) on the leading side when the blade is rotating in a clockwise or cutting direction. On the opposite sides of the cutting sections (17) is a shortened cutting edge (19) and adjacent these cutting edges (19) are upstanding flaps (20) extending at an obtuse angle to the plane of the cutting section and also partially over the associated cutting edges (19). The function of these flaps is to blow air and assist in the removal of cuttings from the housing when the blade is rotating in a cutting direction.

The blade is directly mounted to the shaft of an electric motor (not shown) which is mounted to the top of the housing. This motor is a single phase motor and can rotate in either direction thereby enabling the blade (13) to rotate in either a clockwise or first direction or an anticlockwise or second direction.

The mower includes a switching mechanism (not shown) to enable the direction of rotation of the electric motor and hence the blades to be changed.

When the blade rotates in a first (clockwise) direction, the mower operates in a normal cutting mode and grass cuttings from a lawn being cut move in the housing in a clockwise direction. Because the cuttings tend to move upwardly as well, they move into and through the exit chute (7) where they may be collected by the grass container, if used.

If the direction of rotation of the blade (13) is reversed to a second (anticlockwise) direction, the grass cuttings moving in the same direction cannot easily move through the exit chute (7) not only because of its adverse tangential positioning, but also because of the deflector plate (12) and the fact that the lower portion of the exit chute (7) is closed by the extended cylindrical wall (10) of the housing. These grass cuttings tend to move upwardly but are deflected downwardly into the cutting path of the blade inter alia by the deflector plate (12) where they are more finely cut for eventually falling onto the lawn surface through the bottom (16) of the housing.

Because these grass cuttings are more finely cut than the normal grass cuttings, they more easily embed themselves in the lawn surface and form a suitable mulch therefore.

It will be appreciated that a lawn could be mowed using the "mulching" mode (i.e. with the blade in an anticlockwise or second direction), alternately with use of the mower in a normal mowing mode (with the blade moving in a clockwise or first direction). In this way a lawn could be mulched on a regular basis and the excess grass cuttings could be easily picked up during a subsequent mowing operation.

The invention thus provides an apparatus for the treatment of lawns which can readily be changed from a mowing operation to a mulching operation.

Other embodiments are envisaged within the scope of the invention including other shapes and configurations of the apparatus and its component parts.

What I claim as new and desire to secure by Letters Patent is:

1. Apparatus suitable for treating lawns comprising:
   a shallow generally cylindrical housing having an opening bottom and adapted, in use, to have its axis perpendicular to a lawn to be cut;
   a blade, mounted within the housing to rotate about an axis co-axial with that of the housing, the blade extending radially from the axis and rotating in a plane near the bottom to the housing; a grass exit chute communicating with the inside of the housing;
   a source of rotational power for rotating the blade;
   means whereby a user may optionally change the direction of rotation of the blade; and
   means for allowing grass cut during use of the apparatus to pass out of the housing into the chute when the blade is rotating in a first direction and causing cut grass to move in said first direction; and to deflect cut grass in the housing away from the chute when the blade is rotating in a second direction and causing the cut grass to move in said second direction and, whereby there is a deflector means within the housing adjacent the chute, the deflector means being positioned to deflect grass cuttings cut by the blade moving in the second direction from entering the chute.

2. Apparatus as claimed in claim 1 in which the housing is mounted on wheels for supporting it on a grass surface to be cut.

3. Apparatus as claimed in claim 2 which includes a handle for use in pushing the apparatus on a grass surface.

4. Apparatus as claimed in claim 1 in which the blade extends on both sides of its rotational axis and has cutting edges on opposing edges.

5. Apparatus as claimed in claim 1 in which the grass exit chute is located substantially tangentially to the housing and intercepting the path of grass cuttings in the housing when the blade is rotating in a first direction.

6. Apparatus as claimed in claim 5 in which the grass exit chute is at least partially located above the level of the blade.

7. Apparatus as claimed in claim 1 in which the source of rotational power is an electric motor.

8. Apparatus as claimed in claim 1 in which the means for changing the direction of rotation of the blade is a reversible electric motor and a suitable switching mechanism.

* * * * *